April 14, 1953 W. F. SHURTS 2,634,583
VERTICAL AXIS, ROTARY HYDRAULIC COUPLING
Original Filed Feb. 1, 1946 3 Sheets-Sheet 1
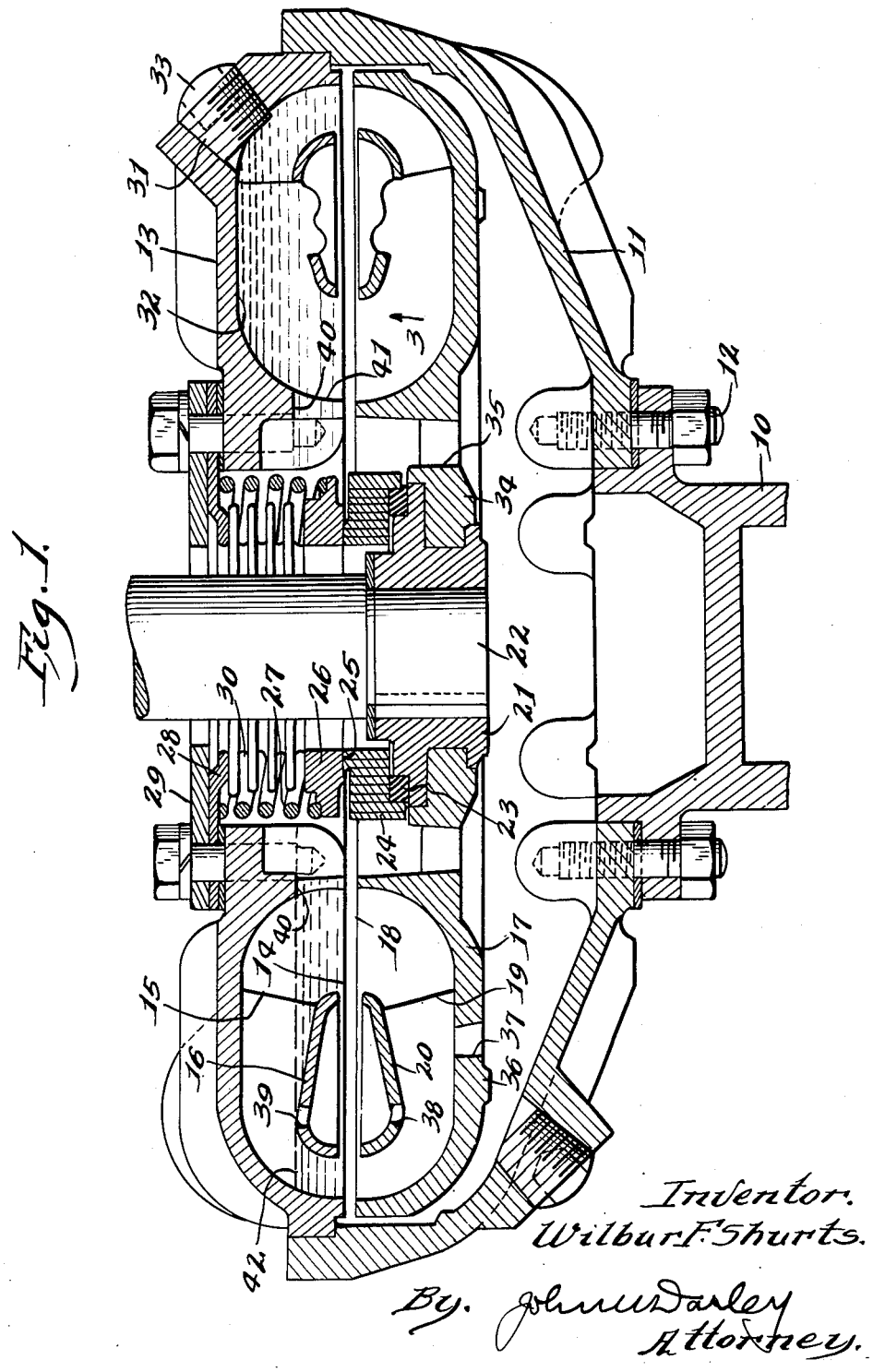
Inventor.
Wilbur F. Shurts.
By John W. Darley
Attorney.

April 14, 1953   W. F. SHURTS   2,634,583
VERTICAL AXIS, ROTARY HYDRAULIC COUPLING
Original Filed Feb. 1, 1946   3 Sheets-Sheet 2
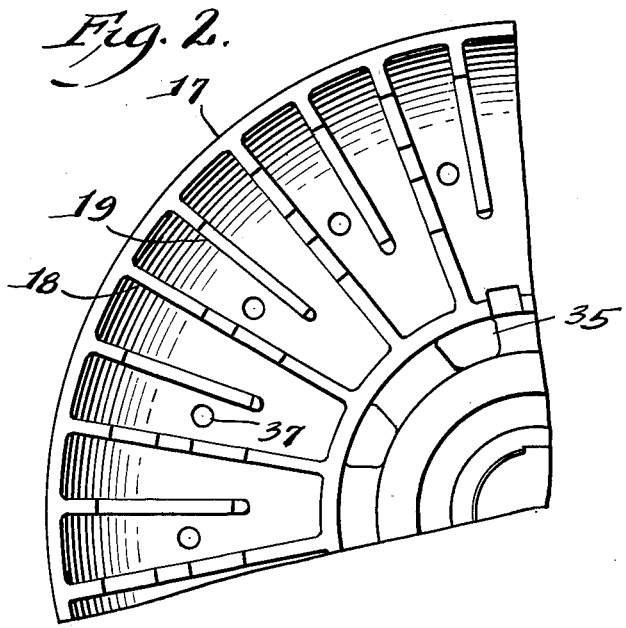
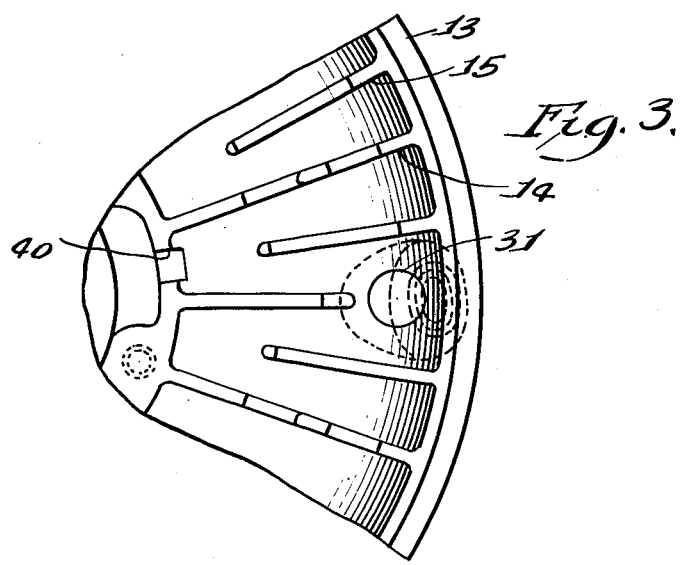
Inventor.
Wilbur F. Shurts
By John M Darley
Attorney.

April 14, 1953 W. F. SHURTS 2,634,583
VERTICAL AXIS, ROTARY HYDRAULIC COUPLING
Original Filed Feb. 1, 1946 3 Sheets-Sheet 3

Inventor.
Wilbur F. Shurts.
By John W. Darley
Attorney.

Patented Apr. 14, 1953

2,634,583

UNITED STATES PATENT OFFICE 2,634,583

VERTICAL AXIS, ROTARY HYDRAULIC COUPLING

Wilbur F. Shurts, Rockford, Ill., assignor to Twin Disc Clutch Company, Racine, Wis., a corporation of Wisconsin Original application February 1, 1946, Serial No. 644,863. Divided and this application December 15, 1948, Serial No. 65,491

5 Claims. (Cl. 60—54)

My invention relates to vertical axis, hydraulic couplings and more particularly to a unit of this type which is arranged to prevent excessive trapping of air during filling.

As habitually used, the axis of a hydraulic coupling is positioned horizontally, but there are occasional installations in which it is desirable that the axis be vertically located. This change in position introduces a problem that is not encountered in horizontal operation. When a hydraulic coupling is initially charged with working liquid, usually an oil, about 90% of the space within the coupling is filled with oil, leaving about a 10% air space to accommodate expansion of the oil as its temperature rises during operation, the coupling referred to being of the closed type. In the horizontal coupling, this result is accomplished by rotating the coupling until the filler opening is positioned a predetermined distance from the topmost part of the unit.

However, when a coupling is operated vertically, its radial, liquid passages are disposed horizontally so that when filled from the top, the volume of air that is trapped by the walls of the passages is so large that it is impossible to introduce a sufficient amount of the working liquid.

It is therefore the principal object of my invention to provide a hydraulic coupling for vertical operation whose interior is arranged to prevent air trapping when filled and to insure its filling with an adequate quantity of the working liquid.

A further object is to provide a coupling of the character indicated in which the impeller and runner members are provided with vent openings through which air that would otherwise be trapped by the liquid poured into the coupling flows to the upper part of the coupling, the vents being arranged to provide an accumulation of air sufficient to accommodate expansion of the working liquid during operation of the coupling.

These and further objects of the invention will be set forth in the following specification, reference being had to the accompanying drawings, and the novel means by which said objects are effectuated will be definitely pointed out in the claims.

This application is a division of my copending application for a vertical axis hydraulic coupling, Ser. No. 644,863, filed February 1, 1946, now abandoned.

In the drawings:

Fig. 1 is a sectional elevation of one form of the invention showing the impeller in uppermost position.

Fig. 2 is a fragmentary, plan view of the runner shown in Fig. 1, looking downwardly, the core ring being omitted.

Fig. 3 is a partial view of the impeller shown in Fig. 1, looking in the direction of the arrow 3, the core ring being omitted.

Figure 4:
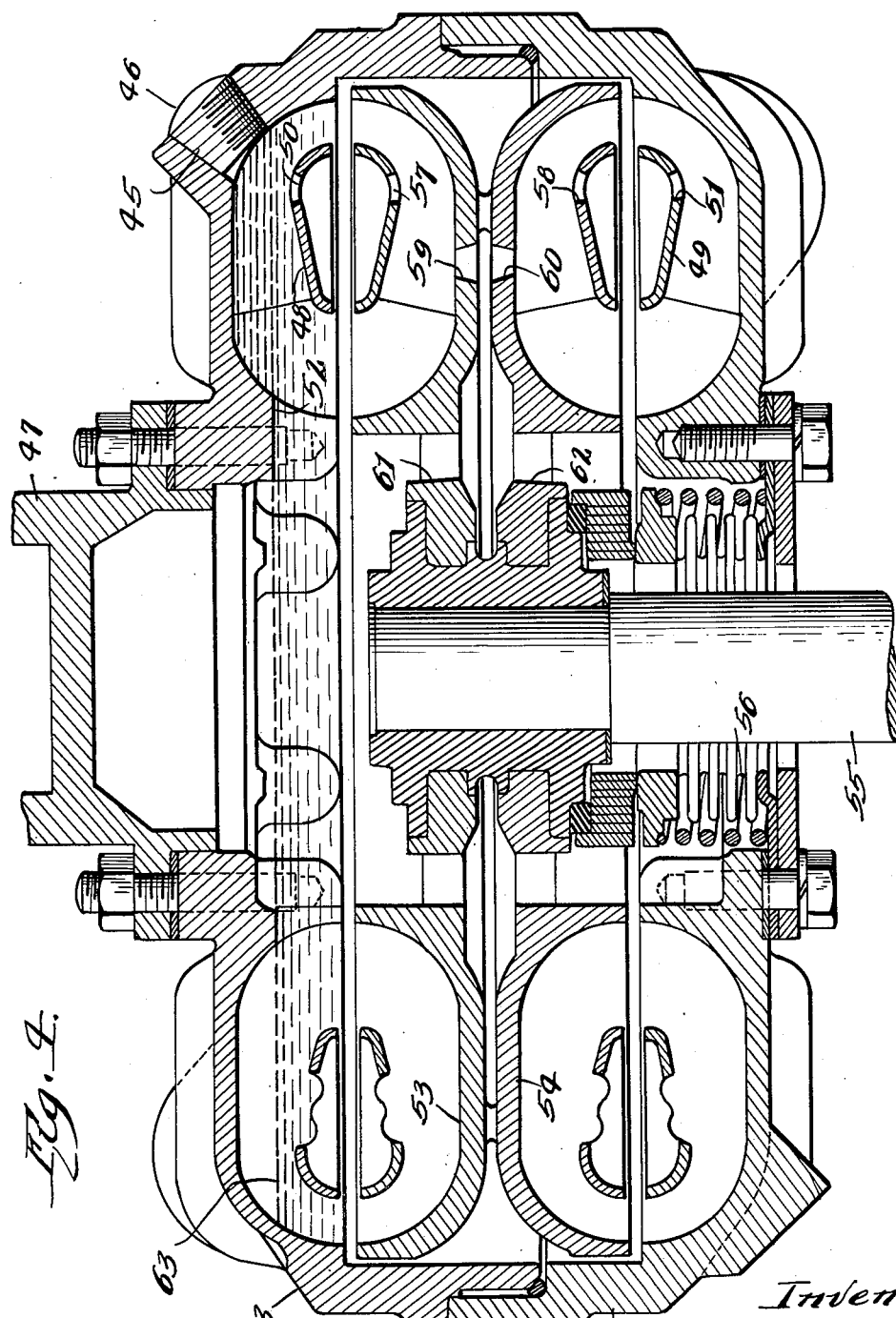
Fig. 4 is a sectional elevation of a twin circuit, hydraulic coupling embodying the invention.

Referring to Fig. 1 of the drawings, the numeral 10 designates a collar providing a driving connection between a shaft (not shown) whose axis is vertical and the inner rim of a cover 11 to which the collar is secured by means of studs 12. The cover 11 closes the bottom of the coupling and its apertured central portion may be closed by the collar 10. The outer rim of the cover 11 is secured in any approved manner to the outer rim of an impeller 13 which faces downwardly and is provided with alternating long and short blades 14 and 15, respectively, and a core ring 16 which together define the characteristic radially, liquid passages.

A runner 17 is disposed beneath the impeller 13 and is provided with alternating long and short blades 18 and 19, respectively, and a core ring 20 which forms radial liquid passages that are located in facing and cooperating relation to the similar passages of the impeller 13, thus forming a single circuit, hydraulic coupling. The runner 17 is connected to a hub 21 that is keyed to a driven shaft 22 coaxial with and extending upwardly through the impeller 13. However, power flow through the coupling may be reversed without affecting its operability and, in this event, the impeller 13 becomes a runner and the runner 17 serves as an impeller.

As a means of sealing the top of the coupling around the shaft 22, a cushion ring 23 is mounted on a shouldered, upper portion of the hub 21 and resting on the ring 23 in clearance relation to the hub and encircling the shaft 22 is a mating ring 24 having an annular nose 25. The ring 24 rotates with the hub 21 and sealingly contacting the nose 25 is a packing ring 26 whose contact is constantly maintained by a helical spring 27, the opposite ends of which respectively abut the ring 26 and a carrier ring 28 that is clamped against the top wall of the impeller 13 by a plate 29 through which the shaft 22 extends. A bellows 30 encircles the shaft 22 and has its opposite ends secured to the rings 26 and 28, respectively.

A filler opening 31 is provided in the impeller 13 and is positioned so that at least a portion thereof is coincident with the inner, top surface 32 of the impeller. This opening is closed by a screw plug 33. So far as described, the coupling is identical with the characteristic unit that operates with its axis horizontal, but certain modifications become important when the coupling operates vertically to insure its filling with the correct amount of liquid and no more, having regard to accommodating expansion of the liquid in a closed coupling.

The horizontal web portion 34 of the runner 17 between the hub 21 and the working circuit part of the runner is provided with a plurality of apertures 35, while the annular, horizontal portion 36 of the working circuit wall is provided with a plurality of apertures 37 which are spaced to register with alternate passages formed by the blades 18 and 19 (see Figs. 1 and 2). Apertures 38 are also formed in the core ring 20 and these apertures respectively register with the same passages with which the apertures 37 communicate.

The impeller core ring 16 is provided with apertures 39 which register with alternate passages defined by the blades 14 and 15. To prevent air trapping at the center of the coupling, oppositely disposed, radial slots 40—40 are cut through the annular, impeller wall 41 which partially defines the inlets to the working passages of the impeller.

When the liquid is poured into the coupling, it fills the cover 11 and rises upwardly through the apertures 35, 37, 38 and 39 and around the periphery of the runner, completely filling the passages in the runner and without trapping any air. The liquid also completely fills the working passages in the impeller that register with the filler opening 31 as shown in Fig. 1, but all other passages in the impeller fill to a level about as represented by the line 42 in Fig. 1 which is determined by the depth of the slots 40. The unfilled spaces in the latter passages provide the approximately 10% expansion factor that is normally required to accommodate expansion of the liquid in a closed coupling.

The above arrangement of venting apertures and slots is equally applicable to a twin circuit coupling since the latter would differ from the single circuit unit shown only in substituting for the cover 11 a second impeller which faces upwardly and securing in back to back relation to the runner 17 a second runner in cooperating relation to the substituted impeller.

Such an arrangement is shown in Fig. 4 wherein downwardly and upwardly facing impellers 43 and 44, respectively, are connected in spaced relation. These impellers are identical in every respect with the exception that the impeller 43 is provided with a filler opening 45 that is closed by a plug 46, the opening being related to certain of the working passages of the impeller 43 as described for the impeller 13 in Fig. 1. The central portion of the impeller 43 is closed by a collar 47 which may provide a connection with a driving member (not shown). The impellers 43 and 44 include core rings 48 and 49 having venting apertures 50 and 51, all respectively, and the impeller 43 additionally includes radial slots 52 which connect the working passages with the central portion thereof, all as described for the impeller 13.

Interposed between the impellers 43 and 44 and in respective cooperating relation therewith are runners 53 and 54 which are secured in back to back relation with their hubs connected to a shaft 55 that extends downwardly and is surrounded for a portion of its length by a sealing means, generally indicated by the numeral 56, that is identical with the bellows seal shown in Fig. 1, except that it is reversed in position. Each of the runners 53 and 54 is identical with the runner 17 in Fig. 1 and therefore respectively include venting apertures 57 and 58 in their core rings, venting apertures 59 and 60 in the horizontal portions of the working circuit walls, and venting apertures 61 and 62 in their hub portions.

Hence, when the coupling is filled through the opening 45, the liquid will completely fill the working passages of the impeller 44 and the runners 53 and 54, air being vented from these elements through the apertures 51, 58, 60, 62, 59, 61 and 57. Further, the liquid will completely fill those working passages in the impeller 43 with which the opening 45 immediately communicates and the remaining passages will fill to about the line 63 in the same manner as described for the impeller 13. The coupling then contains an adequate amount of working liquid with sufficient air space left to accommodate expansion.

I claim:

1. In a vertical axis, rotary, hydraulic coupling of the closed type, the combination of upper and lower, semi-toroidal, bladed members arranged in facing relation to define a torus chamber, the blades dividing the respective semi-toroidal chambers into radial liquid passages and the upper member having a filler opening registering with at least one radial passage thereof, and a plurality of venting passages connecting selected radial passages in the upper member including said one passage with the portion of the upper member radially inward of the semi-toroidal chamber thereof whereby said one radial passage is filled with working liquid and air is trapped in the remaining passages of the upper member in an amount sufficient to accommodate expansion of the working liquid during operation of the coupling.

2. In a vertical axis, rotary hydraulic coupling of the closed type, the combination of upper and lower, semi-toroidal, bladed members arranged in facing relation to define a torus chamber, the semi-toroidal chamber of each member including a cup-shaped annulus and a core ring spaced therefrom which define with the associated blades a plurality of radial liquid passages, the core ring in the upper member having a plurality of upwardly venting apertures and the upper member having a filler opening registering with at least one radial passage thereof, and a pair of slots in the radially inward, annulus wall of the upper member for connecting a pair of radial passages thereof with the axial portion of the coupling, the slots extending upwardly from the lower edge of said wall and terminating below the tops of the associated radial passages, respectively, and one of the slots registering with said one radial passage whereby said one radial passage is filled with working liquid and air is trapped in the remaining passages of the upper member in an amount sufficient to accommodate expansion of the working liquid during operation of the coupling.

3. In a vertical axis, rotary hydraulic coupling of the closed type, the combination of upper and lower, semi-toroidal, bladed members arranged in facing relation to define a torus chamber, a cover secured to the upper member in enclosing and spaced relation to the lower member, the semi-toroidal chamber of each member including a cup-shaped annulus and a core ring spaced therefrom which define with the associated blades a plurality of radial liquid passages, the core ring in the upper member having a plurality of upwardly venting apertures and the upper member having a filler opening registering with at least one radial passage thereof, and a pair of slots in the radially inward wall of the upper member annulus for connecting a pair of radial passages thereof with the axial portion of the coupling, the slots extending upwardly from the lower edge of said wall and terminating below the tops of the associated radial passages, respectively, and one of the slots registering with said one radial passage whereby said one radial passage is filled with working liquid and air is trapped in the remaining passages of the upper member in an amount sufficient to accommodate expansion of the working liquid during operation of the coupling.

4. In a vertical axis, rotary hydraulic coupling of the closed type, the combination of upper and lower, semi-toroidal, bladed members arranged in facing relation to define a torus chamber, the semi-toroidal chamber of each member including a cup-shaped annulus which defines with the associated blades a plurality of radial liquid passages and the upper member having a filler opening registering with at least one radial passage thereof, and a pair of slots in the radially inward wall of the upper member annulus for connecting a pair of radial passages thereof with the axial portion of the coupling, the slots extending upwardly from the lower edge of said wall and terminating below the tops of the associated radial passages, respectively, and one of the slots registering with said one radial passage whereby said one radial passage is filled with working liquid and air is trapped in the remaining passages of the upper member in an amount sufficient to accommodate expansion of the working liquid during operation of the coupling.

5. In a vertical axis, rotary hydraulic coupling of the closed type having twin circuits, the combination of top and bottom, semi-toroidal, bladed members secured in opposed and spaced relation, oppositely facing, upper and lower, intermediate, semi-toroidal, bladed members secured together, the top and upper intermediate members and the bottom and lower intermediate members, respectively, being arranged in facing relation to define upper and lower torus chambers, the semi-toroidal chamber of each member including a cup-shaped annulus and a core ring spaced therefrom which define with the associated blades a plurality of radial liquid passages, the core rings in the top and lower intermediate chambers and the annulus in the lower intermediate chambers having a plurality of upwardly venting apertures and the top member having a filler opening registering with at least one radial passage thereof, and a pair of slots in the radially inward wall of the top member annulus for connecting a pair of radial passages thereof with the axial portion of the coupling, the slots extending upwardly from the lower edge of said wall and terminating below the tops of the associated radial passages, respectively, and one of the slots registering with said one radial passage whereby said one radial passage is filled with working liquid and air is trapped in the remaining passages of the upper member in an amount sufficient to accommodate expansion of the working liquid during operation of the coupling.

WILBUR F. SHURTS.

References Cited in the file of this patent

UNITED STATES PATENTS

| Number | Name | Date |
| --- | --- | --- |
| 1,572,972 | Tabb | Feb. 16, 1926 |
| 2,240,270 | Schaefer | Apr. 29, 1941 |
| 2,375,635 | Dyer | May 8, 1945 |
| 2,380,596 | Hertrich | July 31, 1945 |
| 2,397,869 | Kirby | Apr. 2, 1946 |
| 2,404,900 | Carlson | July 30, 1946 |
| 2,468,107 | Powell | Apr. 26, 1949 |